(12) United States Patent
Fox et al.

(10) Patent No.: US 6,779,835 B2
(45) Date of Patent: Aug. 24, 2004

(54) ENERGY ABSORBING STRUCTURE FOR AUTOMOBILE INTERIOR

(75) Inventors: David M. Fox, Wixom, MI (US); George B. Byma, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/201,362

(22) Filed: Jul. 23, 2002

(65) Prior Publication Data

US 2003/0107242 A1 Jun. 12, 2003

Related U.S. Application Data

(60) Provisional application No. 60/337,953, filed on Dec. 6, 2001.

(51) Int. Cl.[7] .............................................. B60R 21/02
(52) U.S. Cl. ................... 296/187.05; 296/210; 296/214
(58) Field of Search ................................. 296/188, 189, 296/214, 210, 187.05

(56) References Cited

U.S. PATENT DOCUMENTS

| | | |
|---|---|---|
| 802,727 A | 10/1905 | Alschuler |
| 1,630,459 A | 5/1927 | Zeidler |
| 1,918,149 A | 7/1933 | Sullivan |
| 3,011,602 A | 12/1961 | Ensrud et al. |
| 3,779,595 A | 12/1973 | Suzuki et al. |
| 3,810,656 A | 5/1974 | Fox et al. |
| 3,879,025 A | 4/1975 | Dillard |
| 3,953,067 A | 4/1976 | Isola |
| 4,123,085 A | 10/1978 | Oda et al. |
| 4,190,276 A | 2/1980 | Hirano et al. |
| 4,411,121 A | 10/1983 | Blacklin et al. |
| 4,545,172 A | 10/1985 | Wardill |
| 4,711,424 A | 12/1987 | Neubert et al. |
| 4,957,797 A | 9/1990 | Maeda et al. |
| 5,033,593 A | 7/1991 | Kazuhito |
| 5,040,646 A | 8/1991 | Drefahl |
| 5,080,427 A * | 1/1992 | Sturrus et al. ......... 296/187.12 |
| 5,163,730 A | 11/1992 | Welch |
| 5,306,066 A | 4/1994 | Saathoff |
| 5,398,989 A | 3/1995 | Winter et al. |
| 5,433,478 A | 7/1995 | Naruse |
| 5,564,744 A | 10/1996 | Frost |
| 5,785,303 A | 7/1998 | Kutschi |
| 5,795,013 A | 8/1998 | Keller et al. |
| 5,833,304 A | 11/1998 | Daniel et al. |
| 5,836,641 A | 11/1998 | Sugamoto et al. |

(List continued on next page.)

FOREIGN PATENT DOCUMENTS

| | | |
|---|---|---|
| DE | 40 15 375 A1 | 11/1991 |
| DE | 197 04 195 C1 | 10/1998 |
| EP | 0888 952 A1 | 1/1999 |
| JP | 2001 206177 A | 7/2001 |
| JP | 2002029353 A * | 1/2002 |

*Primary Examiner*—Jason Morrow
(74) *Attorney, Agent, or Firm*—Bill C. Panagos

(57) ABSTRACT

An impact absorbing member having a contact wall and base wall that are separated by first and second spacing walls. The spacing walls are oriented to be not aligned with the anticipated direction of an impact force. The spacing walls may be flat, curved, or formed in the shape of a bellows. The base wall may be provided with an adhesive or may include additional fastening features such as holes through which glue or fasteners may pass or may be formed as fastening rosettes.

35 Claims, 5 Drawing Sheets

U.S. PATENT DOCUMENTS

| | | |
|---|---|---|
| 5,851,626 A | 12/1998 | McCorry et al. |
| 5,884,962 A | 3/1999 | Mattingly et al. |
| 5,979,139 A | 11/1999 | Early |
| 6,036,227 A | 3/2000 | Lin et al. |
| 6,042,176 A | 3/2000 | Ideda et al. |
| 6,086,098 A | 7/2000 | Reiter et al. |
| 6,092,959 A | 7/2000 | Leonhardt et al. |
| 6,142,522 A | 11/2000 | Bossenmaier et al. |
| 6,170,808 B1 | 1/2001 | Kutschi |
| 6,199,907 B1 | 3/2001 | Mugford et al. |
| 6,199,941 B1 | 3/2001 | Takahara et al. |
| 6,199,942 B1 | 3/2001 | Carroll, III |
| 6,234,526 B1 | 5/2001 | Song et al. |
| 6,244,626 B1 | 6/2001 | Monaghan et al. |
| 6,244,637 B1 | 6/2001 | Leonhardt et al. |
| 6,244,638 B1 | 6/2001 | Kuczynski et al. |
| 6,254,172 B1 | 7/2001 | Takahara |
| 6,264,238 B1 | 7/2001 | MacDonald et al. |
| 6,293,614 B1 | 9/2001 | Takahara et al. |
| 6,557,929 B2 * | 5/2003 | Fox et al. .......... 296/189 |

* cited by examiner

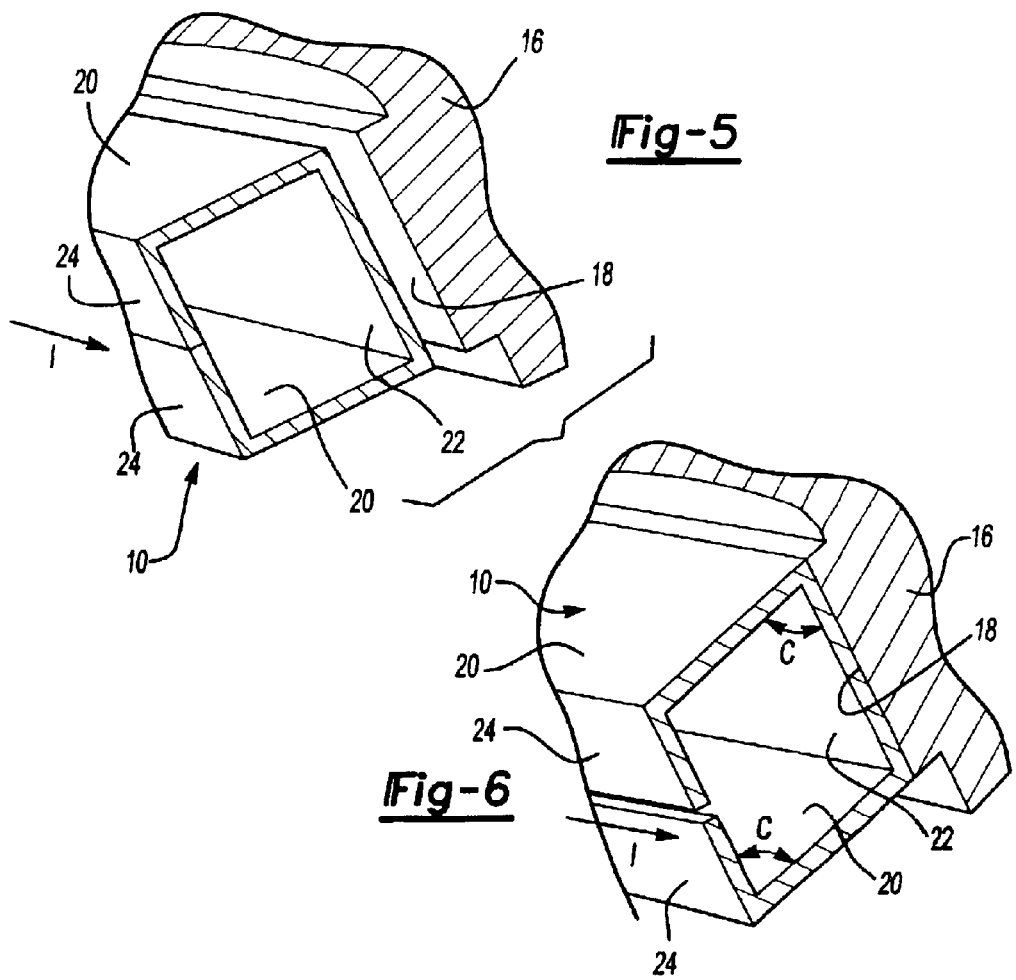
*Fig-5*
*Fig-6*
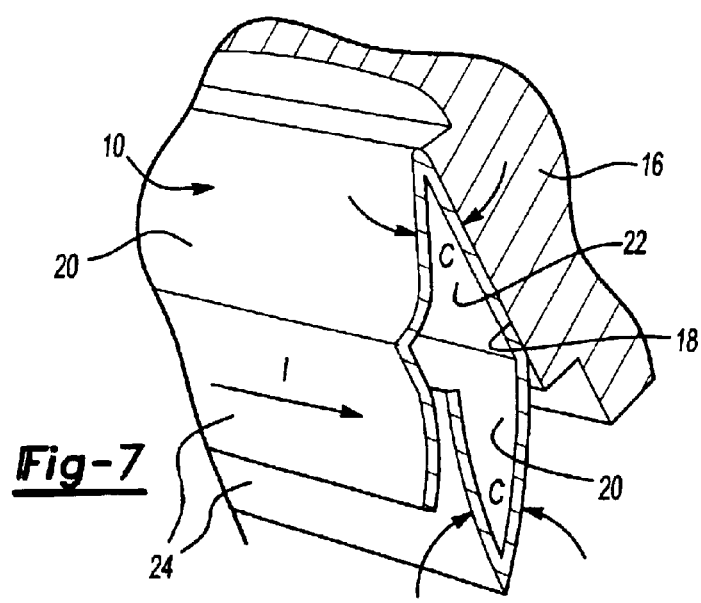
*Fig-7*

ENERGY ABSORBING STRUCTURE FOR AUTOMOBILE INTERIOR

CROSS-REFERENCE TO RELATED APPLICATIONS

This application claims the benefit of U.S. provisional application Serial No. 60/337,953 filed Dec. 6, 2001.

BACKGROUND OF THE INVENTION

1. Field of the Invention

The present invention relates to an impact energy absorbing member that may be disposed between interior automotive trim pieces and body-in-white vehicle components or other structural components.

2. Background Art

Impact energy absorbing members are necessitated by motor vehicle safety standards relating to design of vehicles to minimize injury to occupants. In particular, head impact injuries may be reduced or minimized by including impact energy absorbing elements between interior trim pieces and structural members that define the vehicle body surrounding the passenger compartment. Examples of structural members in the passenger compartment of the vehicle include A, B and C pillars that support the vehicle roof and define window and door openings. Such impact energy absorbing members may also be inserted between a headliner and peripheral areas of a vehicle roof such as the windshield header and roof rails.

Different approaches have been taken to the design and arrangement of impact energy absorbing members. Impact energy absorbing members may be attached to the greenhouse support structure beams as is disclosed in U.S. Pat. No. 6,012,764 which discloses the concept of providing a deformable sheet that is secured to a greenhouse beam of an automobile. The deformable sheet has a plurality of frusto-conical or spherical protrusions that extend toward the interior of the vehicle for absorbing impact energy.

Another approach disclosed in U.S. Pat. No. 5,680,886 is the provision of an impact energy absorber comprising of flexible pipe having a quadrangle shaped cross section that is arranged between inner and outer panels of an automobile body. The pipe sections are made of craft paper and aluminum foil that are spiral wrapped. The pipe sections are glued to the inner and outer panels of the automotive body. This design suffers from the disadvantage of being relatively costly to manufacture. A complex manufacturing process is required to form two layers of craft paper and a layer of aluminum into a strand that is wound to form a square shaped flexible pipe.

There is a need for a low cost, easy to manufacture impact energy absorbing member that is lightweight and provides excellent impact absorption as reflected in impact absorption tests normally conducted pursuant to Federal Motor Vehicle Safety Standards. There is also a need for an impact energy absorbing structure that is easily assembled to automotive headliners and interior trim pieces so that they are securely held in place and do not become dislodged during normal vehicle operation. A simple impact energy absorbing member that offers flexible design alternatives and exhibits uniform stiffness regardless of temperature is also needed.

SUMMARY OF THE INVENTION

According to the present invention, several embodiments of an impact energy absorbing member are disclosed that may be formed of sheet metal by a roll forming or sheet metal stamping operation. Alternatively, they could be formed as an extrusion or in an injection molding or blow molding process.

Another aspect of the invention also relates to the manner in which the impact energy absorbing member is secured to headliner or interior trim pieces. The impact energy absorber members are preferably oriented so that the walls of the impact energy absorbing member are not aligned so that they must be compressed when impacted in the direction of the expected impact force. The walls of the impact energy absorbing member preferably extend in an oblique or acute angle relative to the expected angle of impact force. As a result, the impact energy absorbing member is deformed in such a way that the deformation is focused at the corners of the impact absorbing member where adjacent walls intersect. At least some of the corners are caused to deform so that the walls joined at the corner are caused to converge forming a corner having a more acute angle of intersection.

Another aspect of the invention relates to the method in which the impact energy absorbing members are secured to headliners and vehicle trim members. The impact absorbing members may have a wall including holes that are pressed against a hot melt glue or other adhesive that is applied either to the wall of the impact absorbing member or the interior trim piece or headliner such that the adhesive flows into the holes and forms a head on the interior of the wall. The adhesive extruded through the hole forms a head on the inside of the impact absorbing member and functions in a manner similar to a rivet connection. A pressure sensitive adhesive in liquid paste or tape form could also be used to attach the members. Alternatively, stamped rosettes may be formed in a wall that are pressed into engagement with the headliner or trim piece.

These and other aspects of the invention will be more fully understood in view of the attached drawings and following detailed description of various embodiments of applicant's invention.

BRIEF DESCRIPTION OF THE DRAWINGS

FIGS. 5–7 are fragmentary cross-sectional views showing progressive deformation of an impact absorbing member as it is impacted and deformed when it is driven into contact with a portion of a vehicle roof structure;

DETAILED DESCRIPTION OF THE PREFERRED EMBODIMENT(S)

Figure 1:
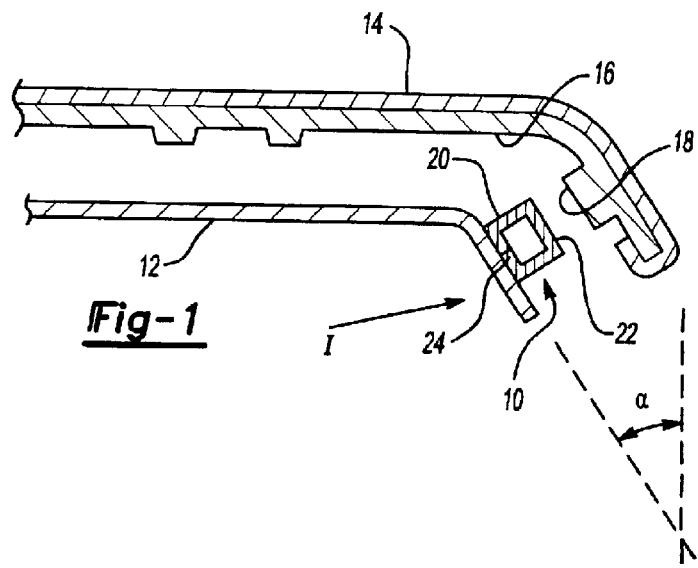
FIG. 1 is a fragmentary cross-sectional view showing a vehicle roof and headliner with the impact energy absorbing member assembled to the headliner.

Referring now to FIG. 1, an impact energy absorbing member 10 is shown secured to a headliner 12. The headliner 12 is assembled to a roof panel 14 and inner roof structure 16 as is well known in the art. The inner roof structure 16 is made up of an inner roof panel and structural reinforcements that are not shown in detail. The inner roof structure 16 defines a contact surface 18 against which the impact energy absorbing member 10 is driven in an impact event. The impact energy absorbing member 10 is secured to the headliner 12 and held at an angle α relative to a vertical axis. The impact arrow I indicates one anticipated direction of impact that is expected in the event of a collision for which the impact energy absorbing member 10 is intended to protect vehicle occupants.

Figure 2:
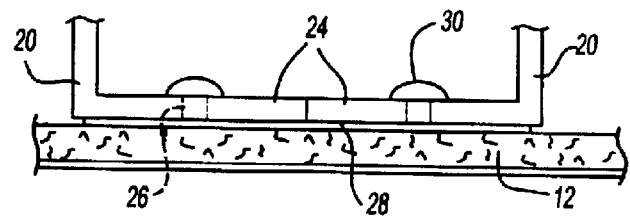
FIG. 2 is a fragmentary end view of an impact energy absorbing member made in accordance with FIG. 1 assembled to a headliner by means of adhesive that is extruded through holes in the member.

The impact energy absorbing member 10 includes spacing walls 20 that space a contact wall 22 from the base wall 24. Referring now to FIG. 2, the relationship of the spacing walls 20 and base wall 24 is shown in greater detail. The base wall 24 is assembled to the headliner 12. The headliner 12 holds the impact energy absorbing member 10 at an angle relative to the impact arrow I so that impact forces are not aligned with any of the walls 20–24 of the impact energy absorbing member 10. In the event an occupant is thrust into the headliner 12 in the area of the impact absorbing member 10, the impact absorbing member 10 is deformed as will be described more specifically with reference to FIGS. 5–7 below.

Figure 3:
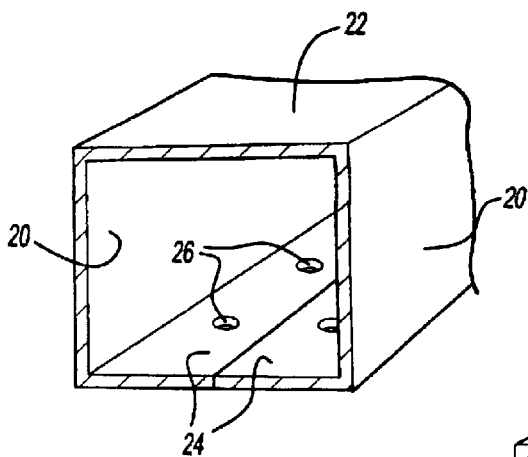
FIG. 3 is a fragmentary perspective view of one embodiment of an impact energy absorbing member.

The impact energy absorbing member 10 may include holes 26 in the base wall 24 as illustrated in FIG. 3. Adhesive 28 is applied to either the headliner 12 or base wall 24 to secure the impact energy absorbing member 10 to the headliner 12. Adhesive 28 may be extruded through the holes 26 to form an extruded adhesive head 30 that serves to lock the impact energy absorbing member 10 to the headliner 12.

Figure 4:
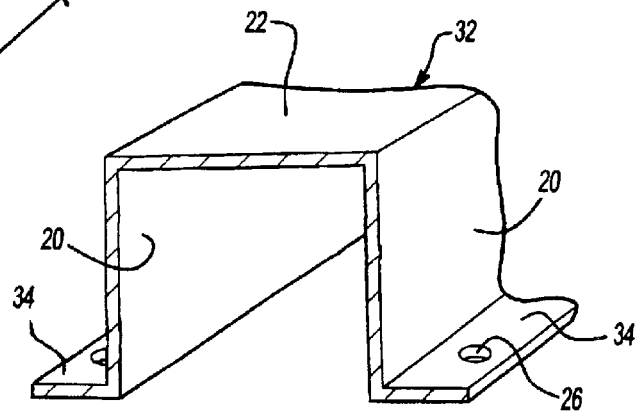
FIG. 4 is a fragmentary perspective view of another embodiment of an impact energy absorbing member.

Referring now to FIG. 4, an open base embodiment generally indicated by reference numeral 32 is illustrated. The open base impact absorbing member 32 is generally similar to the impact energy absorbing member 10 and the same reference numerals are used to refer to corresponding parts thereof. The principal difference in the open base impact absorbing member 32 is that mounting flanges 34 are provided instead of base walls 24. The impact absorbing member 32 is secured to the headliner 12 or other interior trim panel by means of the mounting flanges 34.

Referring now to FIGS. 5–7, an impact and subsequent deformation are illustrated schematically. The impact energy absorbing member 10 is shown without the headliner 12 to permit the deformation of the impact energy absorbing member 10 to be more easily viewed. Referring to FIG. 5, the impact energy absorbing member 10 is shown supported relative to the contact surface 18 of the inner roof structure 16 with a slight gap therebetween. The gap is provided to minimize any squeak or rattle that could be created by the impact energy absorbing member 10 contacting the contact surface 18. In FIG. 5, the impact energy absorbing member 10 is shown disposed at an angle of inclination so that the impact represented by impact arrow I is not aligned with the length of any wall of the member 10.

Referring now to FIG. 6, in the initial phases of impact, the contact wall 22 is driven into the contact surface 18 and the base walls 24 and upper spacing wall 20 are driven towards the contact wall 22 and lower spacing wall 20. The arrows at the upper and lower corners of the member 10 indicate the corner where the deformation of the member 10 is focused.

Referring now to FIG. 7, the deformation seen in FIG. 6 is further progressed with the possibility being shown of the base wall 24 being shifted out of alignment while the compression of the corner is more pronounced.

Figure 8:
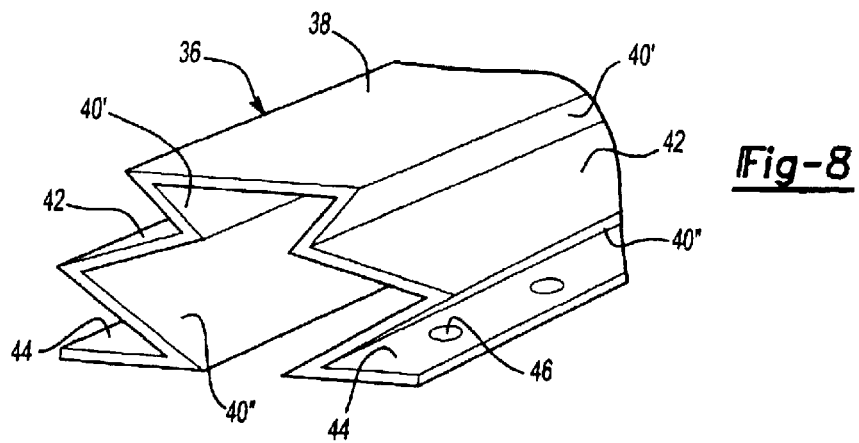
FIGS. 8–15 are fragmentary perspective views of other impact energy absorbing members.

Referring now to FIG. 8, a different embodiment of an impact energy absorbing member is shown that is referred to herein as a Z-bellows open base embodiment 36 wherein a contact wall 38 similar to contact wall 22 of the previously described embodiment is provided. The contact wall 38 is supported by convergent walls 40' and 40" and divergent walls 42. The convergent and divergent references refer to the orientation of the walls relative to the contact wall 38. Mounting flanges 44 are provided on the opposite side of the Z-bellows embodiment 36 from the contact wall 38 and are used to secure the Z-bellows embodiment to the headliner or vehicle trim piece by means of the adhesive as previously described.

Figure 9:
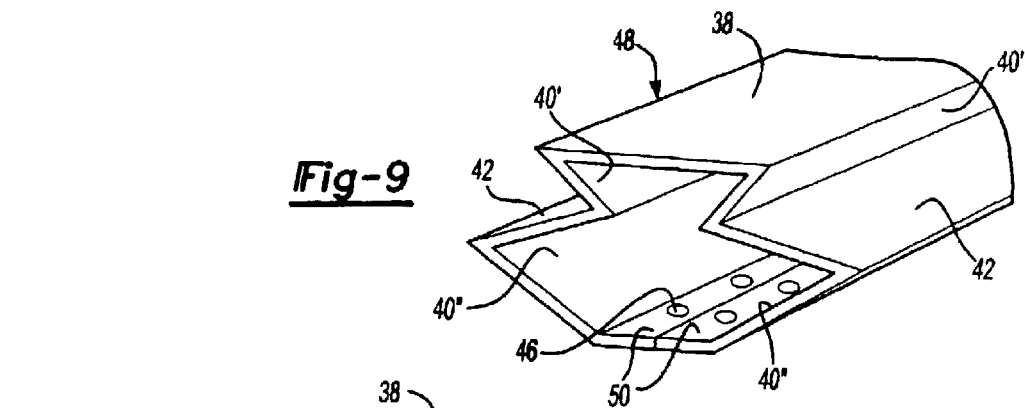

Referring now to FIG. 9, a Z-bellows closed base embodiment 48 is shown that is similar in many respects to the embodiment shown in FIG. 8. Similar reference numerals are used to indicate similar parts. Base walls 50 are shown that extend toward each other. The base walls 50 may be welded if desired or may be formed as two walls that abut one another.

Figure 10:
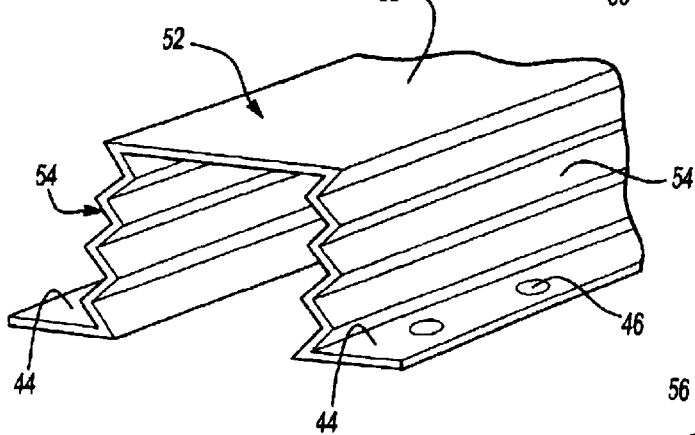

Referring now to FIG. 10, an elongated bellows open base embodiment 52 is shown to include a fan fold wall that interconnects contact wall 38 to flanges 44. Flanges 44 have holes for receiving adhesive that is used to secure the member 52 to an interior trim piece or headliner.

Figure 11:
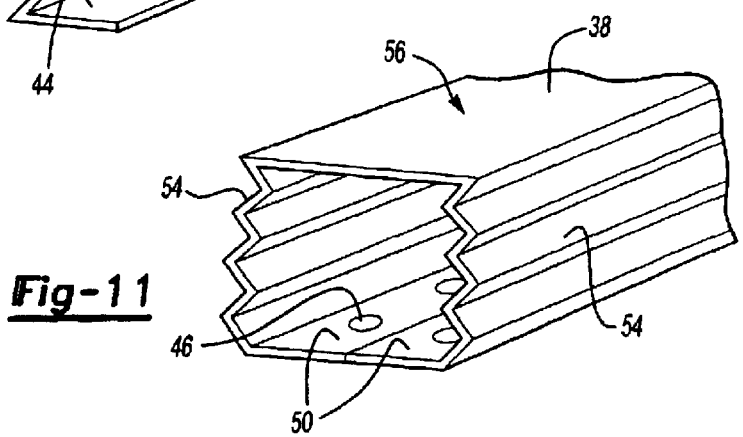

Similarly, in FIG. 11, an elongated bellows closed base embodiment 56 is shown that is similar in all material respects to the embodiment shown in FIG. 10 but includes base walls 50 instead of the mounting flanges 44.

Figure 12:
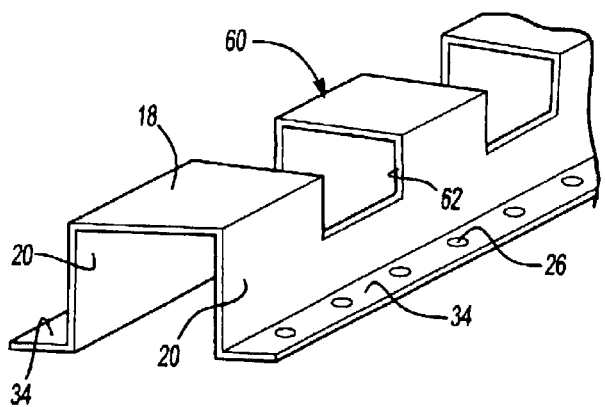

Referring now to FIG. 12, another alternative embodiment of an impact absorbing member is identified by reference numeral 60. This embodiment differs from that of FIG. 4 due to the inclusion of cut-outs 62. The cut-outs 62 may be used to modify the impact absorbing characteristics of the impact absorbing member 60 and also may be provided for the purpose of reducing the weight of the impact absorbing member 60. The cut-outs 62 enhance the flexibility with respect to the elongate length providing ease in mating the member with contoured surfaces within a headliner.

Figure 13:
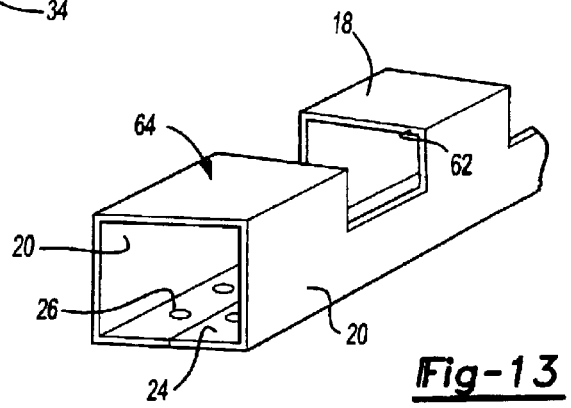

Referring now to FIG. 13, another embodiment is identified by reference numeral 64 that is similar to the impact energy absorbing member of FIG. 3 but is provided with cut-outs 62 as previously described with reference to FIG. 12.

Figure 14:
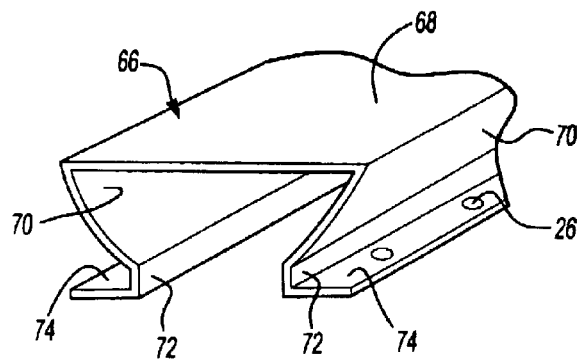

Referring now to FIG. 14, another embodiment is identified by reference numeral 66 that may be referred to as a flared open base embodiment of the impact absorbing member of the present invention. A broadened contact wall 68 is provided and serves a similar purpose to the contact wall 22 described above. Arcuate spacing wall 70 and perpendicular spacing wall 72 combine to space the broadened contact wall 68 from mounting flanges 74. The mounting flanges 74 include holes 26 as previously described that are used to secure the member 66 to an interior trim piece or headliner.

Figure 15:
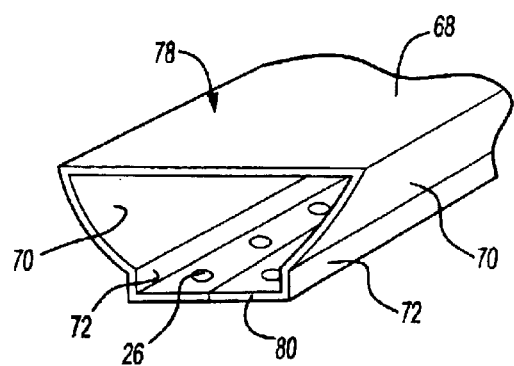

Referring now to FIG. 15, a flared closed base embodiment 78 is shown that is similar in most respects to the embodiment shown in FIG. 14 but includes base walls 80 having holes 26 that extend toward each other from the perpendicular spacing wall 72.

Figure 16:
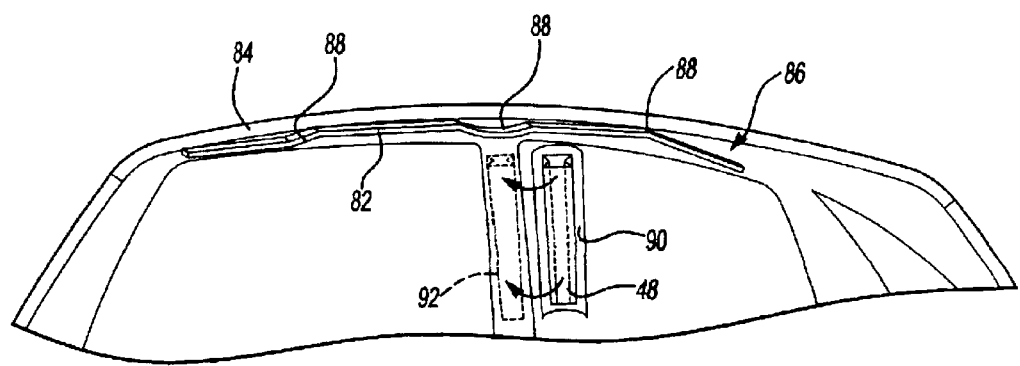
FIG. 16 is a side elevation view of a headliner having a contoured impact energy absorbing member.

Referring now to FIG. 16, an elongated contoured impact energy absorbing member is shown to illustrate how the impact absorbing members may be bent or contoured along their length to provide design flexibility. A headliner is not shown in FIG. 16 so that the contoured impact absorbing member 82 may be seen. The impact absorbing member is mounted below the roof 84 of the vehicle in the roof rail area 86. Several different contoured sections 88 are shown in the drawing to illustrate some of the possible configurations of the elongated contoured impact energy absorbing member 82.

Also shown in FIG. 16 is an interior trim piece 90 that is adapted to be placed over the B-pillar 92 of the vehicle. An impact absorbing member, such as the Z-bellows closed base embodiment 48 shown in FIG. 9, is shown attached to the interior trim piece 90.

Figure 17:
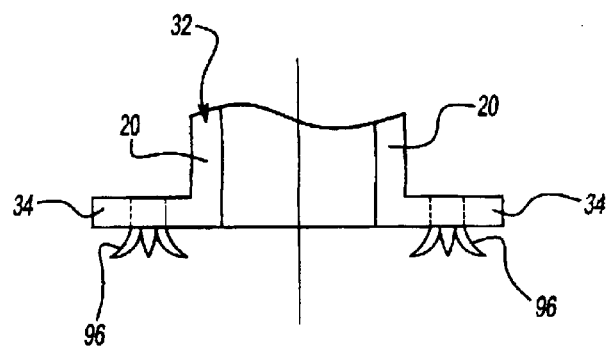
FIG. 17 is an enlarged fragmentary end view of an impact energy absorbing member illustrating an alternative mounting arrangement.

Referring now to FIG. 17, an alternative mounting arrangement is shown wherein mounting flanges 34 are provided with rosettes 96 that are sharp pierced metal portions that may be pressed into a vehicle interior trim piece or headliner to aid in securing the impact absorbing member in place on the interior trim piece or headliner.

The impact absorbing members 10 may be formed using a variety of different manufacturing processes. They may be formed from sheet metal in a roll forming process or in a stamping operation. After forming the impact absorbing member to the desired cross-sectional shape, elongated impact absorbing members 82 as illustrated in FIG. 16 may be additionally formed by bending along its length to follow body contours.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. An impact absorbing member and an interior trim member of a vehicle interior in combination, comprising:
    a base wall adapted to be secured to the interior trim member;
    at least one spacing wall extending in a direction away from the interior trim member, the spacing wall being connected to the base wall on a first end thereof;
    a contact wall connected to a second end of the spacing wall and not in contact with the interior trim member, wherein the contact wall is designed to have an impact force applied thereto; and
    wherein the base wall is formed by two legs.

2. The combination of claim 1 wherein the spacing wall is oriented on the interior trim member with the first and second ends not being in alignment with the impact force.

3. The combination of claim 1 wherein the legs extend in opposite outward directions from the first end of the spacing walls.

4. The combination of claim 1 wherein the legs extend toward each other inwardly from the first end of the spacing walls.

5. The combination of claim 1 wherein the base wall includes holes through which a bonding material applied to the interior trim may be extruded to secure the impact absorbing member to the interior trim member.

6. The combination of claim 1 wherein the base wall includes integrally formed fastening rosettes that secure the impact absorbing member to the interior trim member.

7. The combination of claim 1 wherein the contact wall extends between two spacing walls.

8. The combination of claim 1 wherein the contact wall and spacing wall define openings that span the contact wall and extend partially through the spacing wall from the contact wall.

9. An impact absorbing member and an interior trim member of a vehicle in combination, comprising:
    a base wall adapted to be secured to the interior trim member;
    at least one bellows wall extending in a direction away from the interior trim member, the bellows wall being connected to the base wall on a first end thereof;
    a contact wall connected to a second end of the spacing wall and not in contact with the interior trim member, wherein the contact wall is designed to have an impact force applied thereto; and
    wherein the base wall is formed by two legs.

10. The combination of claim 9 wherein two bellows walls are provided, each bellows wall having a plurality of wall segments that are angularly oriented relative to each other and the base and contact walls, wherein each wall segment is oriented to be not in alignment with the impact force.

11. The combination of claim 9 wherein the legs extend in opposite outward directions from the first end of the spacing walls.

12. The combination of claim 9 wherein the legs extend toward each other inwardly from the first end of the spacing walls.

13. The combination of claim 9 wherein the base wall includes holes through which a bonding material applied to the interior trim may be extruded to secure the impact absorbing member to the interior trim member.

14. The combination of claim 9 wherein the base wall includes integrally formed fastening rosettes that secure the impact absorbing member to the interior trim member.

15. The combination of claim 9 wherein the bellows wall includes a curved wall segment and a flat wall segment.

16. The combination of claim 9 wherein the impact absorbing member is disposed adjacent to a roof support pillar.

17. The combination of claim 9 wherein the impact absorbing member is contoured to follow a roof line of the vehicle with the base wall being secured to an inner roof component and the contact wall is secured to the headliner of the vehicle.

18. An impact absorbing member for a vehicle comprising:
    a sheet metal fabricated member defining a hollow space, the hollow space being bounded by a contact wall, first and second collapsible walls, and a mounting wall;
    wherein the collapsible walls extend between the mounting wall and the contact wall, the first and second collapsible walls being formed in the shape of a bellows to facilitate compression thereof in the event of an impact on the contact wall of at least a predetermined magnitude;
    wherein the collapsible walls are oriented on an interior trim member and the contact wall is not in contact with the interior trim member; and
    wherein the mounting wall is formed by two base legs.

19. The impact absorbing member of claim 18 wherein no segment of the bellows is in alignment with the impact force.

20. The impact absorbing member of claim 18 wherein the legs extend in opposite outward directions from the collapsible walls.

21. The impact absorbing member of claim 18 wherein the legs extend toward each other inwardly from the collapsible walls.

22. The impact absorbing member of claim 18 wherein the mounting wall includes holes through which a bonding material may be extruded to secure the impact absorbing member to the interior trim member.

23. The impact absorbing member of claim 18 wherein the mounting wall includes integrally formed fastening rosettes that secure the impact absorbing member to the interior trim member.

24. The impact absorbing member of claim 18 wherein the contact wall and collapsible walls define openings that span the contact wall and extend partially through the collapsible walls from the contact wall.

25. The impact absorbing member of claim 18 wherein the process used to form the member is a roll forming process.

26. The impact absorbing member of claim 18 wherein the process used to form the member is a stamping process.

27. The impact absorbing member of claim 18 wherein the process used to form the member is an extrusion process.

28. The impact absorbing member of claim 18 wherein the process used to form the member is an injection molding process.

29. The impact absorbing member of claim 18 wherein the process used to form the member is a blow molding process.

30. A method of making an impact absorbing member comprising:

cutting a blank of sheet metal;

forming the blank of sheet metal to include a contact wall, a base wall, and first and second spacing walls that extend between the contact wall and base wall, wherein the contact wall extends from the first spacing wall to the second spacing wall and wherein the base wall is formed by two legs;

forming fastening features on the base wall; and assembling the base wall to a supporting surface in a vehicle with the fastening features facilitating securing the member to the supporting surface.

31. The method of claim 30 wherein the step of forming the blank is performed by a roll forming process.

32. The method of claim 30 wherein the step of forming the blank is performed by a stamping process.

33. The method of claim 30 wherein the step of forming fastener features comprises forming a plurality of holes in the base wall.

34. The method of claim 30 wherein the step of forming fastener features comprises forming rosettes on the base wall.

35. The method of claim 30 further comprising the step of bending the impact absorbing member along its length to follow a contoured portion of a vehicle body.

* * * * *